United States Patent [19]

Feiss

[11] 4,244,388
[45] Jan. 13, 1981

[54] COMBINATION VALVE
[75] Inventor: Roy L. Feiss, Southampton, Pa.
[73] Assignee: Crane Co., New York, N.Y.
[21] Appl. No.: 55,860
[22] Filed: Jul. 9, 1979

Related U.S. Application Data

[63] Continuation of Ser. No. 849,833, Nov. 9, 1977, abandoned.

[51] Int. Cl.³ .......................................... G05D 11/03
[52] U.S. Cl. ............................... 137/116; 137/625.3; 137/625.38; 417/299
[58] Field of Search ...................... 137/115, 116, 625.3, 137/625.33, 625.38; 251/205, 206; 138/45, 45 A, 46; 417/299

[56] References Cited

U.S. PATENT DOCUMENTS

| | | | |
|---|---|---|---|
| 878,183 | 2/1908 | Brauner | 137/625.38 |
| 1,421,309 | 6/1922 | Redfield | 417/299 |
| 2,397,664 | 4/1946 | Hillier | 137/116 |
| 2,642,254 | 6/1953 | Armstrong | 137/625.3 |
| 3,117,590 | 1/1964 | Nelson et al. | 137/625.38 |
| 3,318,321 | 5/1967 | Odendahl | 417/299 |
| 3,358,705 | 12/1967 | Krechel | 137/116 |
| 3,871,397 | 3/1975 | Larsen | 137/116 |
| 4,041,982 | 8/1977 | Lindner | 137/625.3 |

FOREIGN PATENT DOCUMENTS

| | | | |
|---|---|---|---|
| 477657 | 4/1946 | Canada | 137/625.38 |
| 1186504 | 8/1959 | France | 417/299 |

Primary Examiner—William R. Cline
Assistant Examiner—H. Jay Spiegel

[57] ABSTRACT

A combination by-pass and check valve for use in a fluid flow system comprising a valve body having an inlet and outlet and a passage therethrough. A seat disposed in the valve body between the inlet and outlet for location of a check disc thereon, the disc and seat cooperating to prevent fluid flow from the outlet to the inlet. A sleeve having one or more orifices therein extends from the check disc and substantially surrounds a portion of a perforate tubular by-pass located intermediate the seating surface and the inlet. The orifices in the sleeve and the perforations in the by-pass are in at least partial alignment and communication when the disc is on the seat, permitting fluid flow through the by-pass. When fluid flow from the inlet to the outlet has raised the disc a substantial distance off the seat, the orifices in the sleeve are non-aligned with the perforations on the by-pass, preventing fluid flow through the by-pass.

8 Claims, 3 Drawing Figures

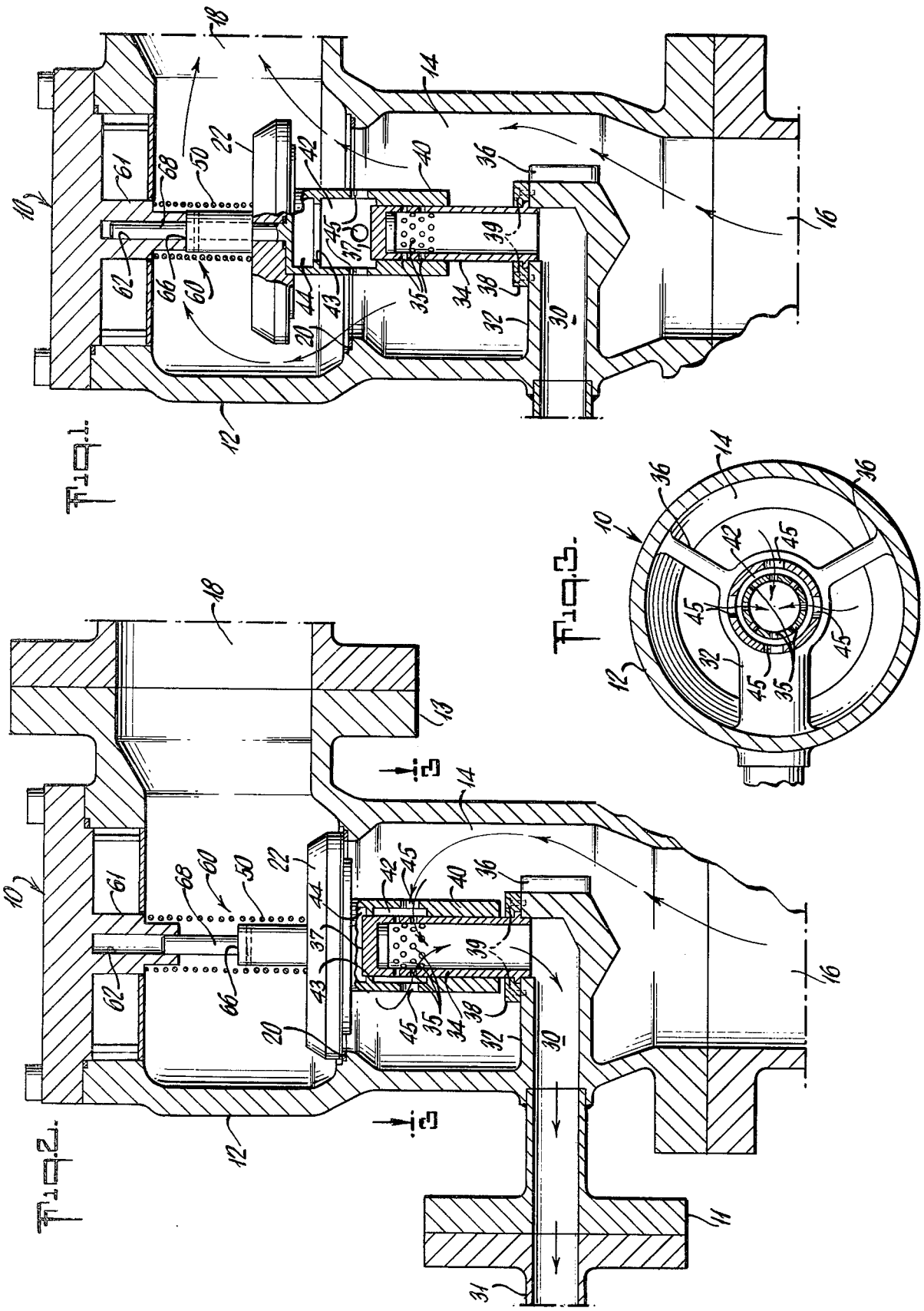

COMBINATION VALVE

RELATED APPLICATION

This case is a continuation of U.S. Application Ser. No. 849,833, filed Nov. 9, 1977, now abandoned.

BACKGROUND AND SUMMARY OF THE INVENTION

This invention relates to a combination check and relief valve having broad application in fluid transfer systems, one being the installation on the discharge side of centrifugal pumps. Pumps of this type frequently are left running while the flow through them is blocked by closing valves downstream. Leaving a centrifugal pump running over an extended period of time causes the fluid to be heated to unacceptably high temperatures by the mechanical action of the pump on the fluid, thereby damaging the pump seals.

Frequently, it is desirable to install a check valve in a fluid transfer system to provide positive protection against back-flow. This is particularly true when there is a centrifugal pump in the system, since fluid can back-flow through the pump clearances while the pump is stopped.

In the past, it has been common to install two separate devices to provide for pump by-pass and positive back-flow protection, which may be unacceptably expensive.

In the prior-art, there have been attempts to produce combination by-pass and check valves. However, these valves have had several inherent disadvantages. The internal construction of these valves has tended to be rather complex, resulting in the combination valve being relatively expensive to manufacture. Also, because of this complex construction, it has been relatively difficult to alter the flow rate through the by-pass line. Furthermore, the fluid flow path through these valves has tended to be rather tortuous, thereby causing excessive pressure drop through the valve and increasing the possibility of pluggage from impurities in the fluid.

In is an object of this invention to provide a relatively inexpensive, reliable combination by-pass and check valve having a low pressure drop from the inlet to the outlet.

It is a further object to provide a combination by-pass and check valve in which the flow rate through the by-pass can be altered relatively easily.

The subject invention comprises a valve having a seat between the inlet and outlet on which rests a check disc to block reverse flow. A tubular by-pass located in the valve body intermediate the inlet and the seat comprises a radially extending tubular section and a perforate, tubular section. A sleeve integral with, and extending from the disc concentric with the perforate tubular section has one or more orifices therethrough and a circumferential recess therein. When valves downstream of the subject invention are closed to prevent fluid flow while the pump is running, the disc is seated. All fluid entering the valve passage from the inlet flows through orifices in the sleeve, into the sleeve recess, and finally through the perforations in the perforate tubular section into the by-pass. When the downstream valves are opened slightly, a portion of the fluid will flow from the inlet to the outlet, thereby moving the disc slightly off its seat, while the remaining fluid will flow through into the by-pass as previously described. As the rate of fluid flow is increased through the valve passage from the inlet to the outlet by opening the downstream valves still further, the disc is increasingly moved away from it seat, threby further moving the sleeve. This movement of the sleeve enventually results in the orifices and circumferential recess in the sleeve being totally non-aligned, non-communicating with the perforations in the tubular section, thereby preventing any flow through the by-pass.

BRIEF DESCRIPTION OF THE DRAWINGS

FIG. 1 is an elevational view in section of this invention when fluid is flowing from the inlet to the outlet and there is no fluid flow through the by-pass;

FIG. 2 is an elevational view in section when there is no fluid flowing from the inlet to the outlet and all fluid flow is through the by-pass; and, FIG. 3 is a plan sectional view taken along line 3—3 of FIG. 2.

DETAILED DESCRIPTION OF THE INVENTION

Referring to the Drawings, a combination check and by-pass valve, generally indicated by 10, is shown having a body 12 with a passage 14 therethrough from inlet 16 to outlet 18. While valve 10 is shown having flanged connections 11, 13, other type connections also could be used to secure the valve in the fluid flow system. Intermediate the inlet and outlet of body 12 is a circumferential seat 20 which cooperates with check disc 22 forming a fluid-tight seal or closure means for fluid flowing from the outlet to the inlet. Sleeve 40 having an internal circumferential recess 42 therein and dashpot restriction 43 is integral with disc 22. A by-pass means, such as by-pass 30, which is operative when check disc 22 is seated, includes perforate tubular section 34, having a closed end 37, concentric with and extending into sleeve 40, and a tubular section 32 radially extending into body 12 and which is in communication and integral with tubular section 34. External fluid flow piping, partially represented by reference numeral 31, and cooling means (not shown) may be installed to recycle and cool fluid passing through by-pass 30. In the position shown in the embodiment, perforate tubular section 34 is vertically disposed while radially extending section 32 is substantially horizontal. Tubular section 32 is cast with the body and is supported by a plurality of radially extending cast legs 36, while perforate tubular section 34 is secured in fluid-tight relationship to section 32 by clamping ring 38 and screws 39, as shown. Fluid may flow from inlet 16, through passage 14, through circumferentially spaced-apart orifices 45 on sleeve 40, through recess 42, then through circumferentially spaced-apart perforations 35 in tubular section 34, and into by-pass 30 when perforations 35 are in alignment or in communication with recess 42 or orifices 45. This occurs when disc 22 is seated or raised slightly above seat 20, as shown in FIG. 1. No fluid will flow through by-pass 30 when disc 22 has been raised to the extent that recess 42 is non-aligned or in communication with perforations 35.

A dashpot chamber 44, formed by disc 22, sleeve 40 and closed end 37 functions to slowly discharge fluid through the clearance formed between dashpot restriction 43 and tubular section 34 and then through perforations 35 and/or orifices 45 when disc 22 is being seated, thereby preventing damage to the disc 22 and seat 20. In the embodiment shown, downwardly extending sleeve 40 and perforate tubular section 34 are both cylindrical, although other shapes also would prove satisfactory. The tolerance between sleeve 40 and section 34 is such as to permit reciprocal movement of the sleeve while minimizing the amount of fluid loss when there is substantial fluid flow through the valve. The sleeve is shown having one row of orifices 45 therethrough, while tubular section 34 has a number of rows of perforations 35. Orifices 45 generally are larger in diameter than perforations 35 in tubular section 34. The sleeve orifices largely serve as a means to introduce and distribute fluid into recess 42, while perforations 35 preferably are oppositely disposed to miniimize the effects of cavitation and control the pressure drop through by-pass 30. As streams of fluid pass through perforations 35, any cavitation bubbles formed therein will be broken by the impingement of oppositely directed streams of fluid, thereby minimizing damage to by-pass 30. Guide means 60 comprises an extension 68 communicating and coaxial with check disc 22 and a disc guide 61 extending from body 10. The disc guide has a cavity 62 therein coaxial with check disc 22 adapted to slidably receive the extension. A stop shoulder 66 preferably is disposed between extension 68 and check disc 22 and is adapted to contact the disc guide when the check disc has been moved a predetermined distance from set 20 by fluid flow. The reciprocation of extension 68 in cavity 62 thus serves to restrict the movement of check disc 22 to coaxial movement, while stop shoulder 66 restricts the total axial movement of disc 22 in its open position within body 12. A biasing means, such as spring 50, is compresingly inserted in passage 14 between check disc 22 and disc guide 61 to urge the disc into engagement with seat 20.

Referring to FIG. 1, when valves (not shown) on the downstream side of valve 10 are opened to permit fluid flow, the fluid discharged by a pump (not shown) through valve 10 from inlet 16 toward outlet 18 will overcome the downward force of spring 50 and lift disc 22 off seat 20. This upward movement of the disc will permit fluid to flow through valve 10 via outlet 18. This elevation of the disc also elevates sleeve 40, which is integral with disc 22, and gradually closes off by-pass 30 by elevating orifices 45 and recess 42 on the sleeve from any communication with perforations 35 on tubular section 34. This displacement of check disc 22 from the seat will be referred to hereinafter as the "first position".

Referring to FIGS. 2 and 3, when valves (not shown) downstream of valve 10 slowly are closed, the volume of fluid flowing from inlet 16 through outlet 18 gradually decreases, thus enabling spring 50 to force disc 22 downwardly toward seat 20. As sleeve 40 and disc 22 move downwardly, recess 42 becomes increasingly aligned and in communication with perforations 35, resulting in an increasing proportion of the fluid in passage 14 flowing through orifices 45, recess 42 and perforations 35 into by-pass 30. When disc 22 finally is seated, all fluid flow from inlet 16 will be directed into by-pass 30. Simultaneously, as disc 22 gradually is forced downwardly, fluid in dashpot chamber 44 will be forced downwardly between tubular section 34 and sleeve 40 to flow into recess 42 and thence through perforations 35 and/or orifices 45 until disc 22 is seated on seat 20. This position of check disc 22 will be referred to as the "second position". From the aforementioned, it can be seen that when valves downstream of valve 10 are again opened with the pump operating, disc 22 will be elevated by the fluid, thereby permitting fluid to again commence flowing from the inlet to the outlet while gradually stopping fluid flow through by-pass 30.

As with most control valves, the dimensions of valve 10 and the components disclosed hereinabove may be varied as required to obtain the desired valve operating characteristics. Normally, pressure drops ranging between 50–3000 p.s.i. are desired when fluid is flowing only through the by-pass to minimize cavitation and noise. This can be obtained by passing the fluid through a multiplicity of small diameter perforations 35, as shown. In one embodiment of the invention, a 10 inch diameter valve, tubular section 34 was approximately 3 inches in diameter having 72 drilled perforations 35, $\frac{1}{4}$ inch in diameter arranged in rows. Sleeve 40 had one row of orifices 45 comprising 8 perforations $\frac{3}{8}$ inch in diameter. Recess 42 was approximately $1\frac{1}{2}$ inches high and $\frac{3}{8}$ inch wide. A pressure drop of 650 p.s.i. was experienced with all flow through the by-pass at a flow rate of 950 g.p.m., while a pressure drop of approximately 7 p.s.i. was experienced at a total flow rate of 4600 g.p.m. from inlet 16 to outlet 18 with by-pass 30 closed to fluid flow. The flow rate through by-pass 30 while disc 22 is partially raised may be regulated by altering the diameter and position of orifices 45 and by altering the height and diameter of recess 42. In the embodiment shown, flow through perforations 35 will occur until the disc has been raised to approximately 75% of its maximum travel.

It should be noted that the operating characteristics of the valve also can be altered by replacing tubular section 34 with a section having different perforate and/or tubular area or by replacing sleeve 40. The operating characteristics could also be modified by plugging a portion of the perforations in section 34, such as by fastening filler rings (not shown) to closed end 37.

In the embodiment shown, small amounts of fluid may pass between sleeve 40 and tubular section 34 into by-pass 30, but normally this will be of little consequence. Such flow could be eliminated by the installation of a seal assembly in the conventional manner between sleeve 40 and tubular section 34. In most applications it is expected that the sealing surfaces of disc 22 and seat 20 normally would be fabricated from relatively hard, long-wearing materials. Where a more fluid-tight seal is desired, more resilient materials compatible with the fluid could be used for one or both of the sealing surfaces.

It is within the contemplation and scope of this invention that this invention includes other by-pass designs within the scope of the claims. Other variations and modifications of the invention will be readily apparent to those skilled in the art without departing from the spirit and scope of that which has been above described.

I claim:

1. A combination fluid by-pass and check valve comprising:
   A. a valve body having an inlet, an outlet, and a passage therebetween;
   B. a seat in said body circumferentially surrounding the passage, said seat adapted to receive a check disc;
   C. a check disc positioned in the passage and cooperating with said seat, said disc having a first position displaced from said seat by fluid flowing from the inlet to the outlet, and a second position forming a closure means when fluid flows from the outlet to the inlet;

D. by-pass means extending into said body and passage, said by-pass means having a number of rows of circumferential perforations of a relatively small diameter disposed to permit fluid flowing through one perforation to impinge upon fluid flowing through another perforation to thereby reduce fluid noise and cavitation; and, E. a sleeve extending from said check disc for movement therewith telescopically cooperating with said by-pass means, said sleeve having a single row of orifices having a diameter larger than the diameter of the perforations, and, a recess in the inner periphery of said sleeve aligned with the single row of orifices, said recess communicating with the number of rows of circumferential perforations in said by-pass means when said check disc is in said second position whereby fluid passes from the orifice through the recess and the number of rows of circumferential perforations into said by-pass means when said check disc is in said second position, and when said check disc is in said first position preventing flow through said by-pass means and allowing flow through said passage from the inlet to outlet.

2. The valve of claim 1 further including a guide means comprising:

A. a disc guide extending from said body toward said check disc, said guide having a cavity therein coaxially aligned with said check disc, said cavity adapted to slidably receive an extension; and B. an extension communicating with said check disc, said extension adapted for reciprocation within the cavity, whereby reciprocation of said extension within the cavity restricts the movement of said check disc to generally axial movement between said first position and said second position.

3. The valve of claim 2 further comprising a biasing means compressingly located in the passage between said check disc and said disc guide, said baising means operating to urge said disc toward said second position.

4. The valve of claim 3 further comprising a stop shoulder disposed between said check disc and said extension, said shoulder adapted to abut said disc guide to prevent further movement of said check disc away from said seat when said check disc is in said first position.

5. The valve of claim 4 wherein said by-pass means is tubular, and wherein the end of said by-pass means located in the passage is closed, whereby fluid from the passage entering said tubular by-pass means, passes through said by-pass means out of said valve body.

6. A combination by-pass and check valve for use in a fluid flow system comprising:

A. a valve body having an inlet, an outlet and a passage therebetween;

B. a seat in said valve body circumferentially surrounding the passage intermediate the inlet and the outlet, said seat adapted to receive a check disc;

C. a check disc cooperating with said seat, said disc being displaced from said seat by fluid flowing from the inlet to the outlet, said disc forming a closure means when fluid flows from the outlet to the inlet;

D. a sleeve attached to said check disc for movement therewith, said sleeve having a single row of orifices therein and a recess in the inner periphery of said sleeve aligned with the single row of orifices; and, E. a by-pass means disposed in the passage and extending through said valve body, said by-pass means telescopically cooperating with said sleeve, said by-pass means having a number of rows of circumferential perforations therein communicating with said recess aligned with the single row of orifices when said check disc forms a closure means with said seat, said perforations disposed to permit fluid flow through one of said perforations to impinge upon fluid flowing through another of said perforations to thereby decrease fluid noise and cavitation, said perforations non-communicating with the recess aligned with the orifice when said check disc is substantially displaced, whereby fluid flows from the passage through the orifices and the recess and perforations into said by-pass means when said check disc forms a closure means, and whereby no fluid flows into said by-pass means when said disc has been substantially displaced by fluid flowing from the inlet to the outlet.

7. The valve of claim 6 further comprising a biasing means disposed in said passage compressingly engaged with said check disc, said biasing means urging said check disc to form a closure means with said seat.

8. The valve of claim 7 further comprising a guide means, said guide means including:

A. an extension in the passage communicating and movable with said check disc, said extension adapted to slidably cooperate with a cavity in a disc guide; and B. a disc guide communicating with said valve body and disposed in said passage, said guide having a cavity therein coaxial with said check disc, said cavity substantially complementary to said extension, whereby displacement of said check disc is restricted to coaxial displacement by the movement of said extension in the cavity.

* * * * *